(12) United States Patent
Subramaniyam

(10) Patent No.: US 10,493,396 B2
(45) Date of Patent: Dec. 3, 2019

(54) HYDROGEN SULFIDE SCAVENGING ADDITIVE COMPOSITIONS, AND MEDIUM COMPRISING THE SAME

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 235 days.

(21) Appl. No.: 15/740,734

(22) PCT Filed: Jun. 17, 2016

(86) PCT No.: PCT/IB2016/053624
§ 371 (c)(1),
(2) Date: Dec. 28, 2017

(87) PCT Pub. No.: WO2017/006199
PCT Pub. Date: Jan. 12, 2017

(65) Prior Publication Data
US 2018/0185782 A1 Jul. 5, 2018

(30) Foreign Application Priority Data
Jul. 3, 2015 (IN) .......................... 2567/MUM/2015

(51) Int. Cl.
| | | |
|---|---|---|
| B01D 53/02 | (2006.01) | |
| B01D 53/14 | (2006.01) | |
| C10L 3/10 | (2006.01) | |
| C10L 1/10 | (2006.01) | |
| C10L 1/14 | (2006.01) | |
| C10G 29/00 | (2006.01) | |
| C08L 95/00 | (2006.01) | |
| C08K 3/24 | (2006.01) | |
| C08K 5/09 | (2006.01) | |
| C08K 5/098 | (2006.01) | |
| C08K 5/17 | (2006.01) | |
| C10G 29/06 | (2006.01) | |
| C10L 1/188 | (2006.01) | |
| C10L 1/222 | (2006.01) | |
| C10L 1/12 | (2006.01) | |

(52) U.S. Cl.
CPC ............ *B01D 53/1468* (2013.01); *C08K 3/24* (2013.01); *C08K 5/09* (2013.01); *C08K 5/098* (2013.01); *C08K 5/17* (2013.01); *C08L 95/00* (2013.01); *C10G 29/00* (2013.01); *C10G 29/06* (2013.01); *C10L 1/10* (2013.01); *C10L 1/14* (2013.01); *C10L 3/103* (2013.01); *B01D 2252/2041* (2013.01); *B01D 2252/20405* (2013.01); *B01D 2256/24* (2013.01); *B01D 2257/304* (2013.01); *C10G 2300/207* (2013.01); *C10L 1/1283* (2013.01); *C10L 1/1881* (2013.01); *C10L 1/2225* (2013.01); *C10L 2200/0213* (2013.01); *C10L 2200/043* (2013.01); *C10L 2200/0423* (2013.01); *C10L 2200/0438* (2013.01); *C10L 2230/02* (2013.01); *C10L 2290/545* (2013.01); *C10L 2300/20* (2013.01)

(58) Field of Classification Search
CPC ........... C08L 95/00; C08K 5/098; C08K 5/17; C08K 5/09; B01D 2252/20405; B01D 2252/2041; B01D 2256/24; B01D 53/1468; C10L 1/10; C10L 1/1283; C10L 1/14; C10L 1/1881; C10L 1/2225; C10L 2200/0213; C10L 2200/0423; C10L 2200/043; C10L 2200/0438
See application file for complete search history.

(56) References Cited

U.S. PATENT DOCUMENTS

| | | |
|---|---|---|
| 5,000,835 A | 3/1991 | Taylor et al. |
| 6,221,277 B1 | 4/2001 | Scranton, Jr. |

(Continued)

FOREIGN PATENT DOCUMENTS

| | | |
|---|---|---|
| CN | 102828724 A | 12/2012 |
| IN | 2567MUM2015 | 7/2015 |

(Continued)

OTHER PUBLICATIONS

Foreign communication from the corresponding International Application No. PCT/IB2016/053624, International Search Report and Written Opinion, dated Sep. 1, 2016, 12 pages.

(Continued)

*Primary Examiner* — Christopher P Jones
(74) *Attorney, Agent, or Firm* — Conley Rose, P.C.; Rodney B. Carroll

(57) ABSTRACT

The present invention relates to a hydrogen sulfide scavenging additive composition, wherein the composition comprises:
 a. an additive 1 comprising at least one compound selected from the group comprising zinc compound, zinc soap, and zinc salt of organic acid; and
 b. at least one activator comprising one or more hydroxyl alkylated amine.

In one embodiment, the composition further comprises an additive 2 comprising polyphosphoric acid (PPA).
In one embodiment, the present invention also relates to a method of using the hydrogen sulfide scavenging additive compositions of the present invention for scavenging the hydrogen sulfide in the medium.
In one embodiment, the present invention also relates to a method of scavenging hydrogen sulphide in the medium by employing the hydrogen sulfide scavenging additive compositions of the present invention.
In one embodiment, the present invention also relates to a medium comprising hydrogen sulfide ($H_2S$) scavenging additive compositions of the present invention.

17 Claims, No Drawings

(56) References Cited

U.S. PATENT DOCUMENTS

| | | |
|---|---|---|
| 8,246,813 B2 | 8/2012 | Compton et al. |
| 9,278,307 B2 | 3/2016 | Lehrer et al. |
| 2005/0145137 A1 | 7/2005 | Buras et al. |
| 2008/0039344 A1 | 2/2008 | Devereux et al. |
| 2011/0160355 A1 | 6/2011 | Martin |
| 2014/0190870 A1 | 7/2014 | Lehrer et al. |
| 2015/0025258 A1 | 1/2015 | Poland |
| 2016/0256833 A1* | 9/2016 | Itoh ............... B01D 53/228 |

FOREIGN PATENT DOCUMENTS

| | | |
|---|---|---|
| WO | 03055578 A1 | 7/2003 |
| WO | 2008088632 A2 | 7/2008 |
| WO | 2017006199 A1 | 1/2017 |

OTHER PUBLICATIONS

Foreign communication from the corresponding International Application No. PCT/IB2016/053624, Written Opinion of the International Preliminary Examining Authority, dated May 24, 2017, 12 pages.

Md Azimul Haque, et al., "Effect of Triethanolamine on Zinc Oxide Nanoparticles," Materials Focus, vol. 2, No. 6, 2013, pp. 469-474, XP055297036, American Scientific Publishers.

Database WPI Week 201352 Thomson Scientific, XP002760999 and CN102828724.

* cited by examiner

HYDROGEN SULFIDE SCAVENGING ADDITIVE COMPOSITIONS, AND MEDIUM COMPRISING THE SAME

CROSS REFERENCE TO RELATED APPLICATIONS

This application is a filing under 35 U.S.C. 371 of International Application No. PCT/IB2016/053624 filed Jun. 17, 2016, entitled "Hydrogen Sulfide Scavenging Additive Compositions, and Medium Comprising the Same," which claims priority to Indian Patent Application No. 2567/MUM/2015 filed Jul. 3, 2015, which applications are incorporated by reference herein in their entirety.

FIELD OF THE INVENTION

The present invention relates to hydrogen sulfide ($H_2S$) scavenging additive compositions, and a medium comprising the same.

In particular, the present invention relates:
(A) to hydrogen sulfide ($H_2S$) scavenging additive compositions comprising:
  1. an additive 1 comprising at least one compound selected from the group comprising zinc compound, zinc soap, and zinc salt of organic acid; and
  2. at least one activator capable of enhancing hydrogen sulfide ($H_2S$) scavenging efficiency of the additive 1, and
(B) to a medium comprising the hydrogen sulfide ($H_2S$) scavenging additive composition of the present invention.

In one embodiment, the present invention relates to a method of scavenging hydrogen sulfide ($H_2S$) in a medium by employing the hydrogen sulfide scavenging additive compositions of the present invention.

In another embodiment, the present invention relates to a method of using the hydrogen sulfide ($H_2S$) scavenging additive compositions of the present invention for scavenging hydrogen sulfide in a medium.

The prior art additive, i.e., the compound selected from the group comprising zinc compound, zinc soap, and zinc salt of organic acid, and/or zinc octoate (ZnOctoate) herein after may be referred to as the "additive 1".

The another prior art additive consisting of or comprising polyphosphoric acid (PPA) herein after may be referred to as the "additive 2", As per the present invention, the "medium" is a material, which contains $H_2S$ or a sulfur compound, or will form a sulfur compound including hydrogen sulphide when in use. As per the present invention, the "medium" may be selected from the group comprising, but not limited to, hydrocarbons, crude oil, gasoline, diesel oil, fuel oil, bitumen, asphalt including asphalt refinery residue, kerosene oil, etc., which either contains the $H_2S$ or a sulfur compound, or will form $H_2S$ or a sulfur compound when in use. It is clarified that this medium when it comprises the hydrogen sulfide ($H_2S$) scavenging additive composition of the present invention is one of the embodiments (i.e. the above embodiment (B)) of the present invention.

The medium after treatment with the additive 1 herein after may be referred to as the "treated medium 1".

The "treated medium 1" after further treatment with the additive 2 herein after may be referred to as the "treated medium 2".

BACKGROUND OF THE INVENTION

The prior art additive consisting of or comprising zinc octoate (ZnOctoate) is known to scavenge hydrogen sulphide ($H_2S$) in asphalt/bitumen/crude oil/hydrocarbons.

The U.S. Pat. No. 5,000,835 discloses use of zinc octoate, zinc naphthenate as $H_2S$ scavenging additive in asphalt.

The U.S. Pat. No. 8,246,813 B2 discloses use of zinc octoate as $H_2S$ scavenging additive in crude oil.

The US patent publication no. US 2015/0025258 A1 discloses a method for preparing zinc carboxylate oxo complex composition and discloses use of zinc octoate as $H_2S$ scavenging additive in hydrocarbons.

The U.S. Pat. No. 9,278,307 B2 discloses use of a combination of zinc octoate and dibutylamine formaldehyde reaction product as $H_2S$ scavenging additives in crude oil.

The US publication no. US 2008/039344 A1 discloses use of a zinc compound, such as zinc citrate as chelating agent to form a chelate between the metal (Cu or Zn) and a base being monoethanol amine (MEA).

The US publication no. US 2014/190870 A1 discloses use of a composition comprising at least one transition metal and at least one water-soluble aldehyde or water-soluble aldehyde precursor.

The US publication no. US 2005/145137 A1 discloses a composition of zinc with ethanolamine and mercaptobenzothiazole (MBT).

However, none of the prior art document discloses or teaches how to reduce the amount of the additive 1 of the present invention, that is, how to overcome the problem of using higher amount of the prior art additive 1 to scavenge the H2S so as to have economical composition for scavenging hydrogen sulfide in the medium.

The US patent publication no. US 2011/0160355 discloses use of polyphosphoric acid (PPA) (the additive 2) as $H_2S$ scavenging additives, but without combining it with ZnOctoate.

However, the industry further treats the medium treated with the additive 1 (for example, with ZnOctoate) with the additive 2 (i.e. with polyphosphoric acid (PPA)). However, the Inventor of the present invention has found that the said further treatment with the additive 2 (i.e. with polyphosphoric acid (PPA)) of the medium treated with the additive 1 (for example, with ZnOctoate) causes re-release of the scavenged $H_2S$ back into the medium, and thereby, reduces the hydrogen sulfide scavenging efficiency of the additive 1.

For example, when just 25 ppm, 50 ppm, and 75 ppm of the additive 1 was added to the medium containing 2000 ppm of $H_2S$, the % efficiency of the additive 1 to scavenge the $H_2S$ in the medium was, respectively found to be 50%, 92.5%, and 100% (respectively referred to as 'treated medium 1A', 'treated medium 1B', and 'treated medium 1C')—Re Expt. Nos. 1, 3 and 5 of Table 1.

However, the Inventor of the present invention has found that when the treated medium 1A, the treated medium 1B, and the treated medium 1C were separately further treated with just 1% by weight of the additive 2, then the efficiency of the additive 1 was, respectively found to substantially reduce from 50% to 30%, from 92.5% to 57.5%, and from 100% to 65%, respectively, in case of the treated medium 1A, the treated medium 1B and the treated medium 1C (Re Expt. Nos. 2, 4, and 6 of Table 1).

Such reduction in the hydrogen sulfide scavenging efficiency of the additive 1 on addition of the additive 2 in the medium treated with the additive 1 may be attributed to the reasons of re-release of the scavenged $H_2S$ back into the medium on addition of the additive 2.

These experiments have shown that addition of the additive 2 substantially reduces the hydrogen sulfide scavenging efficiency of the additive 1, and hence, the additive 2 has a negative effect on the hydrogen sulfide scavenging efficiency of the additive 1.

Therefore, the additive 2 (for example, PPA), which is not only expensive, but also causes re-release of hydrogen sulfide from the medium treated with the additive 1 (for example, with ZnOctoate), and hence, the additive 2 has a negative effect on the hydrogen sulfide scavenging efficiency of the additive 1.

However, the asphalt/bitumen such treated with the additive 1 is modified prior to use in roads/pavements/highways/airstrips etc. The additive 2 (for example, PPA) is the primary level of modifying agent used to improve various properties of the asphalt/bitumen. When the additive 2, i.e. PPA is thus added, it causes release of the $H_2S$ from the asphalt/bitumen treated with the additive 1, and hence, the additive 2 has a negative effect on the $H_2S$ scavenging efficiency of the additive 1.

The industry has, therefore, desired either to reduce the amount of the additive 2, that is, PPA, or to eliminate it totally from the composition, so that its negative effect on the hydrogen sulfide scavenging efficiency of the additive 1 (i.e. ZnOctoate) may be reduced or eliminated.

The industry is, therefore, looking for an improved additive composition which is capable of improving $H_2S$ scavenging efficiency of the additive 1.

The industry is, therefore, also looking for an improved additive composition which is capable of improving $H_2S$ scavenging efficiency of the additive 1 even in presence of the additive 2, that is, capable of eliminating or at least reducing the negative effect of the additive 2.

Therefore, there is a need to have a solution to the above-discussed industrial problems.

Particularly, there is a need to have:

(I) An improved hydrogen sulfide ($H_2S$) scavenging additive composition which is capable of improving $H_2S$ scavenging efficiency of the additive 1; and (II) An improved hydrogen sulfide ($H_2S$) scavenging additive composition which is capable of improving $H_2S$ scavenging efficiency of the additive 1 even in presence of the additive 2, that is, at least capable of reducing the negative effect of the additive 2; and (III) A method of scavenging hydrogen sulphide in the medium by employing the improved hydrogen sulfide ($H_2S$) scavenging additive compositions of the present invention; and (IV) A method of using the improved hydrogen sulfide ($H_2S$) scavenging additive compositions of the present invention for scavenging the hydrogen sulphide in the medium.

SUMMARY OF THE INVENTION

The present invention, therefore, aims to solve the above-discussed industrial problems of the prior art by providing:

(i) An improved hydrogen sulfide ($H_2S$) scavenging additive composition which is capable of improving $H_2S$ scavenging efficiency of the additive 1; and (ii) An improved hydrogen sulfide ($H_2S$) scavenging additive composition which is capable of improving $H_2S$ scavenging efficiency of the additive 1 even in presence of the additive 2, that is, at least capable of reducing the negative effect of the additive 2; and (iii) A method of scavenging hydrogen sulphide in the medium by employing the hydrogen sulfide ($H_2S$) scavenging additive compositions of the present invention; and (iv) A method of using the hydrogen sulfide ($H_2S$) scavenging additive compositions of the present invention for scavenging hydrogen sulphide in the medium; and (v) A medium comprising the hydrogen sulfide ($H_2S$) scavenging additive composition of the present invention.

Therefore, main objects of the present invention are to provide:

(a) An improved hydrogen sulfide ($H_2S$) scavenging additive composition which is capable of improving $H_2S$ scavenging efficiency of the additive 1; and (b) An improved hydrogen sulfide ($H_2S$) scavenging additive composition which is capable of improving $H_2S$ scavenging efficiency of the additive 1 even in presence of the additive 2, that is, at least capable of reducing the negative effect of the additive 2; and (c) A method of scavenging hydrogen sulphide in the medium comprising the $H_2S$ or a sulfur compound, or in the medium which will form $H_2S$ or a sulfur compound when in use by employing the hydrogen sulfide ($H_2S$) scavenging additive compositions of the present invention; and (d) A method of using the hydrogen sulfide ($H_2S$) scavenging additive compositions of the present invention for scavenging hydrogen sulphide in the medium comprising the $H_2S$ or a sulfur compound, or in the medium which will form $H_2S$ or a sulfur compound when in use; and (e) A medium comprising the hydrogen sulfide ($H_2S$) scavenging additive composition of the present invention.

Therefore, one of the objects of the present invention is to provide a hydrogen sulfide ($H_2S$) scavenging additive composition which would overcome the above-discussed industrial problems of the prior art.

Other objects and advantages of the present invention will become more apparent from the following description when read in conjunction with examples, which are not intended to limit scope of present invention.

BRIEF DESCRIPTION OF THE INVENTION

Accordingly, in one (first) embodiment, the present invention relates to an improved hydrogen sulfide ($H_2S$) scavenging additive composition which is capable of improving $H_2S$ scavenging efficiency of the additive 1 so as to overcome the above-discussed industrial problem of the prior art, i.e. which is capable of scavenging the $H_2S$ in the medium at a lower dosage as compared to the prior art additive consisting of or comprising the additive 1.

Accordingly, in another (second) embodiment, the present invention relates to an improved hydrogen sulfide ($H_2S$) scavenging additive composition which is capable of improving $H_2S$ scavenging efficiency of the additive 1 even in presence of the additive 2, that is, at least capable of reducing the negative effect of the additive 2 so as to overcome the above-discussed industrial problem of the prior art so that, if required, the industry may continue to use the additive 2 consisting of or comprising polyphosphoric acid (PPA) without adversely affecting the $H_2S$ scavenging efficiency of the additive 1.

In still another (third) embodiment, the present invention relates to a method of using the hydrogen sulfide ($H_2S$) scavenging additive compositions of the present invention for scavenging hydrogen sulphide in the medium comprising the $H_2S$ or a sulfur compound, or in the medium which will form $H_2S$ or a sulfur compound when in use.

In yet another (fourth) embodiment, the present invention relates to a method of scavenging hydrogen sulfide in the medium comprising the $H_2S$ or a sulfur compound, or in the medium which will form $H_2S$ or a sulfur compound when in use by employing the hydrogen sulfide scavenging additive composition of the present invention.

In yet another (fifth) embodiment, the present invention relates to a medium comprising the hydrogen sulfide ($H_2S$) scavenging additive composition of the present invention.

DETAILED DESCRIPTION OF THE INVENTION

With aim to provide improved additive composition which can solve the above-discussed problems of the prior art, i.e. of using substantially higher amount of the prior art additive 1, the Inventor has found that if an activator comprising an amine of the present invention is added to the medium (i) either along with addition of the additive 1, or (ii) separately after addition of the additive 1 to the medium, then surprising and unexpectedly the activator comprising an amine of the present invention substantially improves the $H_2S$ scavenging efficiency of the additive 1, and thereby overcomes the existing industrial problem of using substantially higher amount of the additive 1 for scavenging the $H_2S$ in the medium comprising $H_2S$ or a sulfur compound.

With aim to solve the above-discussed problems of the prior art for scavenging the $H_2S$ in the medium comprising $H_2S$ or a sulfur compound, the Inventor has found that if an activator comprising an amine of the present invention is added to the medium (i) either along with addition of the additive 2, or (ii) separately after addition of the additive 2 to the medium, then surprising and unexpectedly the activator comprising an amine of the present invention re-scavenges the $H_2S$ in the medium, and thereby overcomes the existing negative effect (industrial problem) of using the additive 2 for scavenging the $H_2S$ in the medium comprising $H_2S$ or a sulfur compound.

Therefore, in first embodiment, the present invention relates to a hydrogen sulfide scavenging additive composition, wherein the composition comprises:
a. an additive 1 comprising at least one compound selected from the group comprising (or comprises one or more of) zinc compound, zinc soap, and zinc salt of organic acid; and
b. at least one activator comprising one or more hydroxyl alkylated amine of the present invention capable of enhancing hydrogen sulfide ($H_2S$) scavenging efficiency of the additive 1.

In accordance with one of the preferred embodiments of the present invention, the additive 1 comprises zinc octoate (ZnOctoate).

In accordance with one of the preferred embodiments of the present invention, the hydroxyl alkylated amine of the present invention contains (comprises) one or more hydroxyl groups in the alkyl chain of the tertiary amine.

In accordance with one of the preferred embodiments of the present invention, the hydroxyl alkylated amine of the present invention preferably contains (comprises) three or four hydroxyl groups in the alkyl chain of the tertiary amine.

In accordance with one of the preferred embodiments of the present invention, the hydroxyl group of the hydroxyl alkylated amine is hydroxyalkyl group.

In accordance with one of the preferred embodiments of the present invention, the hydroxyl alkylated amine of the present invention comprises tri-isopropanol amine or tris(2-hydroxypropyl)amine (TIPA).

In accordance with one of the preferred embodiments of the present invention, the hydroxyl alkylated amine of the present invention comprises a propoxylated derivative of tris(2-hydroxypropyl)amine, i.e. comprises a propoxylated TIPA.

In accordance with one of the preferred embodiments of the present invention, the propoxylated TIPA has an average molecular weight varying from about 600 to about 1400 dalton.

In accordance with one of the preferred embodiments of the present invention, the propoxylated TIPA has an average molecular weight varying from about 600 to about 1300 dalton.

In accordance with one of the preferred embodiments of the present invention, the propoxylated TIPA has an average molecular weight varying from about 1300 to about 1400 dalton.

In accordance with one of the preferred embodiments of the present invention, the hydroxyl alkylated amine of the present invention comprises an ethoxylated derivative of tris(2-hydroxypropyl)amine, i.e. comprises an ethoxylated TIPA.

In accordance with one of the preferred embodiments of the present invention, the ethoxylated TIPA has an average molecular weight varying from about 900 to about 1000 dalton.

In accordance with one of the preferred embodiments of the present invention, the hydroxyl alkylated amine of the present invention comprises N,N,N',N'-Tetrakis (2-hydroxyethyl) ethylene-diamine (THEED).

In accordance with one of the preferred embodiments of the present invention, the hydroxyl alkylated amine of the present invention comprises N,N,N',N'-Tetrakis (2-hydroxypropyl) ethylene-diamine (Quadrol®).

In accordance with one of the preferred embodiments of the present invention, the hydroxyl alkylated amine of the present invention comprises triethanolamine (TEA).

In accordance with one of the preferred embodiments of the present invention, the hydroxyl alkylated amine of the present invention comprises monoethanolamine (MEA).

In accordance with one of the preferred embodiments of the present invention, the hydroxyl alkylated amine of the present invention comprises propoxylated ethylene diamine (PED).

In accordance with one of the preferred embodiments of the present invention, the propoxylated ethylene diamine (PED) has an average molecular weight varying from about 1300 to about 1400 dalton.

In accordance with one of the embodiments of the present invention, the additive 1 comprises zinc octoate (ZnOctoate).

In accordance with one of the preferred embodiments of the present invention, the additive 1 comprises zinc octoate (ZnOctoate) comprising up to about 90% by weight of zinc octoate and rest being the solvent as commercially used for the zinc octoate, and known to person skilled in the art.

In accordance with one of the preferred embodiments of the present invention, the medium is a material, which contains $H_2S$ or a sulfur compound.

In accordance with one of the preferred embodiments of the present invention, the medium is a material, which will form $H_2S$ or a sulfur compound when in use.

In accordance with one of the preferred embodiments of the present invention, the medium is selected from the group comprising (or comprises one or more), but not limited to, hydrocarbons, crude oil, gasoline, diesel oil, fuel oil, bitumen, asphalt including asphalt refinery residue, and/or kerosene oil, etc.

The Inventor of the present invention has found that the additive compositions of the first embodiment surprisingly and unexpectedly improve the $H_2S$ scavenging efficiency of the additive 1.

Therefore, in second embodiment, the present invention relates to a hydrogen sulfide scavenging additive composition, wherein the composition comprises:

a. an additive 1 comprising at least one compound selected from the group comprising (or comprises one or more) zinc compound, zinc soap, and/or zinc salt of organic acid; and b. at least one activator comprising one or more hydroxyl alkylated amine of the present invention capable of enhancing hydrogen sulfide ($H_2S$) scavenging efficiency of the additive 1; and c. optionally comprises an additive 2 consisting of or comprising polyphosphoric acid (PPA).

In accordance with one of the preferred embodiments of the present invention, the additive 1, the activator, and the medium of the second embodiment of the present invention are same as that of the first embodiment of the present invention.

Therefore, in accordance with one of the preferred embodiments of the present invention, the compositions of the first embodiments of the present invention may further comprise (optionally comprise) an additive 2 consisting of or comprising polyphosphoric acid (PPA).

The Inventor of the present invention has found that the additive compositions of the second embodiment surprisingly and unexpectedly improve the $H_2S$ scavenging efficiency of the additive 1 even in the presence of the additive 2, that is, it overcomes the negative effects of the additive 2 for scavenging the hydrogen sulfide in the medium.

Therefore, in third embodiment, the present invention relates to a method of using the hydrogen sulfide scavenging additive compositions of the present invention for scavenging the hydrogen sulfide in the medium.

In accordance with one of the preferred embodiments of the present invention, the additive 1, the activator, and the medium of the additive compositions of the third embodiment of the present invention are same as that of the first embodiment, and the additive 2 is same as that of the second embodiment of the present invention. Therefore, in accordance with one of the preferred embodiments of the present invention, the hydrogen sulfide scavenging additive compositions of the third embodiment are the hydrogen sulfide scavenging additive compositions of the first and second embodiments of the present invention.

Therefore, in fourth embodiment, the present invention relates to a method of scavenging hydrogen sulphide in the medium comprising the $H_2S$ or a sulfur compound, or in the medium which will form $H_2S$ or a sulfur compound when in use by employing the hydrogen sulfide scavenging additive compositions of the present invention.

In accordance with one of the preferred embodiments of the present invention, the additive 1, the activator, and the medium of the additive compositions of the fourth embodiment of the present invention are same as that of the first embodiment and the additive 2 is same as that of the second embodiment of the present invention. Therefore, in accordance with one of the preferred embodiments of the present invention, the hydrogen sulfide scavenging additive compositions of the fourth embodiment are the hydrogen sulfide scavenging additive compositions of the first and second embodiments of the present invention.

Therefore, in fifth embodiment, the present invention relates to a medium comprising: the hydrogen sulfide ($H_2S$) scavenging additive composition of the present invention.

In accordance with one of the preferred embodiments of the present invention, the medium is a material, which contains $H_2S$ or a sulfur compound.

In accordance with one of the preferred embodiments of the present invention, the medium is a material, which will form $H_2S$ or a sulfur compound when in use.

In accordance with one of the preferred embodiments of the present invention, the medium is selected from the group comprising (or comprises one or more), but not limited to, hydrocarbons, crude oil, gasoline, diesel oil, fuel oil, bitumen, asphalt including asphalt refinery residue, and/or kerosene oil, etc.

In accordance with one of the embodiments of the present invention, the composition of the present invention does not comprise one or more of the following amines:

(i) aromatic amine, such as phenylene diamine, particularly N,N,disec-butyl-para-phenylene diamine (UOP5);

(ii) reaction product of dibutylamine and formaldehyde;

(iii) polyaliphatic amine including polyaliphatic ethylene diamine.

It may be noted that the additive compositions of the present invention are applicable at a wide range of temperature as suitable for the processing units for the medium for scavenging the $H_2S$ or the sulfur compound. Therefore, the present invention is not limited by a temperature range at which it may be employed in the medium.

It may be noted that the additive compositions of the present invention may be used with a solvent, or diluent, or a mixture of solvents, or a mixture of diluents suitable for use with the medium and the hydrogen sulphide scavenging composition of the present invention. Therefore, the present invention is not limited by a solvent, or a diluent, or a mixture of solvents, or a mixture of diluents which may be employed along with the additive compositions of the present invention.

It may be noted that the additive compositions of the present invention may comprise the additive 1 and the activator in a weight % ratio varying from about 99:1 to about 1:99, preferably from about 99:1 to about 50:50. It may be noted that the expression "weight % ratio varying from about 99:1 to about 1:99" are intended to include the ratio of 99:1 and 1:99.

It may be noted that in the additive compositions of the first embodiment of the present invention one may add from about 0.001 to 10% by weight of the additive 2 to arrive at the additive compositions of the second embodiment of the present invention. However, it should be noted that the scope of the present invention is not limited by the amount of the additive 2.

It may be noted that the additive compositions of the present invention may be added to the medium in an amount varying from about 0.01 ppm to about 10000 ppm, preferably from about 1 ppm to about 5000 ppm, more preferably from about 1 ppm to about 1000 ppm. It may be noted that the amount of additive composition to be added would depend on medium to which it is to be added and the concentration of hydrogen sulfide or sulfur compound present therein.

It may be noted that the activators of the present invention may be used with various possible additives comprising at least one compound selected from the group comprising zinc compounds, zinc soap, and/or zinc salts of organic acids. It may also be noted that the metal 'zinc' may be replaced with other similar 'metals', which are capable of scavenging the hydrogen sulfide in the medium, and their hydrogen sulfide scavenging efficiency increases on addition of the activator of the present invention.

It may be noted that the present additive compositions may be used in wide range of media, for example the present additive compositions may be used in the medium containing $H_2S$ or a sulfur compound, or the medium which will form a sulfur compound or hydrogen sulphide when in use. As an exemplary embodiment of the present invention, the "medium" may be selected from the group comprising (or comprises one or more), but not limited to, hydrocarbons, crude oil, gasoline, diesel oil, fuel oil, bitumen, asphalt including asphalt refinery residue, and/or kerosene oil, etc., which either contains the $H_2S$ or a sulfur compound, or will form $H_2S$ or a sulfur compound when in use.

It may be noted that the present additive compositions may also comprise additional additives, for example, the corrosion inhibiting additives.

The present invention is now described with the help of following examples, which are not intended to limit scope of the present invention, but have been incorporated for the sake of illustrating the advantages and best mode of the present invention over the prior art.

EXAMPLES

In order to demonstrate surprising and unexpected technical effects and advantages, and synergistic effect of the present invention, the inventor had further treated the above-discussed the treated medium 1A, the treated medium 1B and the treated medium 1C with a mixture comprising 2% by weight of the activator and 1% by weight of the additive 2, and found that surprisingly and unexpectedly the efficiency of the additive 1 did not reduce, respectively from 50% to 30%, from 92.5% to 57.5%, and from 100% to 65% as it had reduced on further treatment of the treated medium 1A, the treated medium 1B and the treated medium 1C with the additive 2, but it surprisingly and unexpectedly increased, respectively from 30% to 60.0% (re Expt. No. 7 of Table 1) when compared with negative affect of the additive 2 of the prior art (re Expt. No. 2 of Table 1), from 57.5% to 87.5% (re Expt. No. 8 of Table 1) when compared with negative affect of the additive 2 of the prior art (re Expt. No. 4 of Table 1), and from 65% to 95% (re Expt. No. 9 of Table 1) when compared with negative affect of the additive 2 of the prior art (re Expt. No. 6 of Table 1).

Therefore, the present experimental findings of Expt. Nos. 7, 8, and 9 (of second embodiment of the present invention) have confirmed that:

a) The activator of the present invention, surprisingly and unexpectedly, substantially reduces negative effect of the additive 2 on the $H_2S$ scavenging efficiency of the additive 1. Therefore, the use of the additive 2 has been made more beneficial than what was known in the prior art.

Therefore, with the development of the present invention, the industry may now use the additive 2 (the primary level of modifying agent) to modify or to improve various properties of the asphalt/bitumen such treated with the additive 1 prior to use in roads/pavements/highways/airstrips etc. as the negative effect of the additive 2 on the $H_2S$ scavenging efficiency of the additive 1 has been substantially reduced.

The Inventor has also observed that the activator of the present invention, surprisingly and unexpectedly, does not adversely affect the $H_2S$ scavenging efficiency of the additive 1 as the additive 2 does. On the contrary, the activator of the present invention, surprisingly and unexpectedly, improves the $H_2S$ scavenging efficiency of the additive 1 (the first embodiment of the present invention).

Therefore, in order to further demonstrate the surprising and unexpected technical effects and advantages, and synergistic effect of the present invention, when the Inventor treated the medium with a composition comprising 25 ppm, 50 ppm, or 75 ppm of the additive 1 and just 2% by weight of the present activator based on the total composition, but without the additive 2, then it was found that the efficiency of the additive 1 surprisingly and unexpectedly, respectively improves from 50% to 80% (re Expt. No. 10 of Table 1), from 92.5% to 97.5% (re Expt. No. 11 of Table 1), and maintained at 100% (re Expt. No. 12 of Table 1), and not reduced.

Therefore, the present experimental findings have confirmed that:

a) The activator of the present invention, surprisingly and unexpectedly, substantially improves or maintains 100% efficiency of the $H_2S$ scavenging efficiency of the additive 1. Therefore, the use of the additive 1 has also been made more beneficial than what was known in the prior art.

The above experimental results have been presented in Table 1.

TABLE 1

| Expt. No. | Samples tested are of Kerosene oil containing 2000 ppm of hydrogen sulfide ($H_2S$) | Amount of $H_2S$ in oil sample (in ppm) [A] (No Treatment) | Amount of $H_2S$ remained after treatment (in ppm) [B] | Total Amount of $H_2S$ scavenged (in ppm) [C] | % Scavenging Efficiency = ([C] * 100)/[A] |
|---|---|---|---|---|---|
| With PPA, but without Activator of the present invention (Prior Art) | | | | | |
| 1 | 25 ppm of ZnOctoate | 2000 | 1000 | 1000 | 50 |
| 2 | 25 ppm of ZnOctoate + 1% by wt. of PPA of total composition | 2000 | 1400 | 600 | 30 |
| 3 | 50 ppm of ZnOctoate | 2000 | 150 | 1850 | 92.5 |
| 4 | 50 ppm of ZnOctoate + 1% by wt. of PPA of total composition | 2000 | 850 | 1150 | 57.5 |
| 5 | 75 ppm of ZnOctoate | 2000 | 0 | 2000 | 100 |
| 6 | 75 ppm of ZnOctoate + 1% by wt. of PPA of total composition | 2000 | 700 | 1300 | 65 |

TABLE 1-continued

| | With PPA and Activator of the present invention (Second Embodiment of the present invention) | | | | |
|---|---|---|---|---|---|
| 7 | 25 ppm of ZnOctoate + 2% by wt. of Activator + 1% by wt of PPA of total composition | 2000 | 800 | 1200 | 60 |
| 8 | 50 ppm of ZnOctoate + 2% by wt. of Activator + 1% by wt of PPA of total composition | 2000 | 250 | 1750 | 87.5 |
| 9 | 75 ppm of ZnOctoate + 2% by wt. of Activator + 1% by wt of PPA of total composition | 2000 | 100 | 1900 | 95 |
| | Only with Activator of the present invention (First Embodiment of the present invention) | | | | |
| 10 | 25 ppm of ZnOctoate + 2% by wt. of Activator of total composition | 2000 | 400 | 1600 | 80 |

| Expt. No. | Samples tested are of Kerosene oil containing 2000 ppm of hydrogen sulfide ($H_2S$) | Amount of H2S in oil sample (in ppm) [A] (No Treatment) | Amount of H2S remained after treatment (in ppm) [B] | Total Amount of H2S scavenged (in ppm) [C] | % Scavenging Efficiency = ([C] * 100)/[A] |
|---|---|---|---|---|---|
| 11 | 50 ppm of ZnOctoate + 2% by wt. of Activator of total composition | 2000 | 50 | 1950 | 97.5 |
| 12 | 75 ppm of ZnOctoate + 2% by wt. of Activator of total composition | 2000 | 0 | 2000 | 100 |

As can be observed, in Expt. Nos. 2, 4, and 6, the $H_2S$ scavenging efficiency of the additive 1 (for example, ZnOctoate) is substantially reduced on addition of the additive 2 (for example PPA), which is a negative effect of addition of the additive 2 on the $H_2S$ scavenging efficiency of the additive 1. These experiments are of the prior art additives for the comparison purpose.

As can be observed, in Expt. Nos. 7, 8, 9, the negative effect of addition of the additive 2 (for example PPA) on the $H_2S$ scavenging efficiency of the additive 1 (for example, ZnOctoate) is substantially reduced on addition of the activator of the present invention, which confirms achievement of the second embodiment of the present invention.

As can be observed, in Expt. Nos. 10, 11, and 12, the $H_2S$ scavenging efficiency of the additive 1 (for example, ZnOctoate) is either substantially improved or maintained on addition of the activator of the present invention, which confirms achievement of the first embodiment of the present invention.

The above experiments may be summarized as follows:

$1^{st}$ set of Experiments (Step 1)—Samples of kerosene oil containing 2000 ppm of $H_2S$ are first treated with prior art additive Zn Octoate (the additive 1), and the total $H_2S$ contents remained are measured, which give values of scavenged $H_2S$ contents as given in Expt. Nos. 1, 3, and 5 of Table 1;

$2^{nd}$ set of Experiments (Step 2A)—The treated samples of kerosene oil from above step—1 are then further treated with 1% by weight of the prior art additive PPA (the additive 2) based on total composition, and the total $H_2S$ contents remained are measured, which give values of scavenged $H_2S$ contents as given in Expt. Nos. 2, 4, and 6 of the Table 1. These experiments have shown that the % scavenging efficiency of Zn Octoate (the additive 1) reduces substantially on subsequent addition of PPA (the additive 2), because the addition of PPA (the additive 2) is believed to results in re-release of $H_2S$ within the reaction mixture;

$3^{rd}$ set of Experiments (Step 2B)—The treated samples of kerosene oil from above step—1 are then further treated with a mixture comprising (a) 1% by weight of the prior art additive PPA (the additive 2) based on total composition and (b) 2% by weight of the activator of the present invention (the invention additive) based on total composition, and the total $H_2S$ contents remained are measured, which give values of scavenged $H_2S$ contents as given in Expt. Nos. 7, 8, and 9 of the Table 1. These experiments have shown that negative effect of addition of PPA (the additive 2) in the samples already treated with Zn Octoate (the additive 1) is substantially reduced just on addition of 2% by weight of the activator of the present invention based on the total composition;

$4^{th}$ set of Experiments—The treated samples of kerosene oil from above step—1 are then further treated with 2% by weight of the activator of the present invention (the invention additive) based on the total composition, that is, without addition of PPA (the additive 2), and the total $H_2S$ contents remained are measured, which give values of scavenged $H_2S$ contents as given in Expt. Nos. 10, 11, and 12 of the Table 1. These experiments have shown that the % scavenging efficiency of Zn Octoate (the additive 1) either improves on subsequent addition of the activator of the present invention (the invention additive) or is maintained at 100% efficiency on addition of the activator of the present invention (the invention additive).

It may be noted that the present invention has been described by explaining a process of scavenging the hydrogen sulfide in a medium as of two-step process. However, the present invention additive compositions are expected to work even if the composition is added either along with the additive 1, or along with the additive 1 and the additive 2.

Therefore, in one of the embodiments of the present invention, the activator of the present invention may also be added in the medium either along with the additive 1, or along with the additive 1 and the additive 2, and thereby to result in a one-step process.

In order to further demonstrate the surprising and unexpected technical effects and advantages, and synergistic effect of the present invention, when the Inventor treated the medium comprising 53000 ppm (higher dosage) of $H_2S$ with a composition comprising additive 1 and just about 5% by weight of the present activator based on the total composition, but without the additive 2, then it was found that the efficiency of the additive 1 surprisingly and unexpectedly improves (re Expt. Nos. 17-27 of Table 2).

These experiments were carried out with asphalt or VR sample, which was heated to melt at about 150° C. before testing. About 300 gm of molten sample was taken in 600 ml capacity autoclave reactor. The autoclave is sealed, stirred at about 200 RPM and heated to about 175° C. for about 20 min. The temperature of about 175° C. was maintained for another about 60 min after which the reactor temperature was allowed to drop to about 120° C.

The $H_2S$ concentration was noted by attaching a gas detector tube in the outlet valve. The $H_2S$ concentration was measured by purging $N_2$ gas into the reactor at a flow-rate of about 100-110 ml/min. The purging of $N_2$ was continued for about 120 min and $H_2S$ was measured from outlet in every 30 min interval. Any increase in $H_2S$ concentration with time was recorded. Upon no increase in $H_2S$ concentration over the time, the experiment was stopped.

TABLE 2

| Expt. No. | Additive (Samples were tested in Asphalt or VR containing 53000 ppm of hydrogen sulfide ($H_2S$)) | Amount of $H_2S$ remained after treatment (in ppm) [A] | Total Amount of $H_2S$ scavenged (in ppm) [B] | % Scavenging Efficiency = ([B] * 100)/53000 |
|---|---|---|---|---|
| 13 | Blank | 53000 | | |
| 14 | ZnOctoate (230 ppm) | 20000 | 33000 | 62.26 |
| 15 | ZnOctoate (500 ppm) | 9000 | 44000 | 83.02 |
| 16 | ZnOctoate (750 ppm) | 1600 | 51400 | 96.98 |
| 17 | ZnOctoate:Tri-isopropanol amine (TIPA) in 95:5 wt. % ratio (250 ppm) | 4200 | 48800 | 92.08 |
| 18 | ZnOctoate:Tri-isopropanol amine (TIPA) in 95:5 wt. % ratio (500 ppm) | 1500 | 51500 | 97.17 |
| 19 | ZnOctoate:Tri-isopropanol amine (TIPA) in 95:5 wt. % ratio (750 ppm) | 10 | 52990 | 99.98 |
| 20 | ZnOctoate:Propoxylated TIPA in 95:5 wt. % ratio (250 ppm) [Avg. MW 1300 to 1400 Dalton] | 4100 | 48900 | 92.26 |
| 21 | ZnOctoate:Propoxylated TIPA in 95:5 wt. % ratio (250 ppm) [Avg. MW 600 to 1300 Dalton] | 10000 | 43000 | 81.13 |
| 22 | ZnOctoate:Ethoxylated TIPA in 95:5 wt. % ratio (250 ppm) [Avg. MW 900 to 1000 Dalton] | 6800 | 46200 | 87.17 |
| 23 | ZnOctoate:Monoethanol amine (MEA) in 94.85:5.15 wt. % ratio (242.5 ppm) | 7800 | 45200 | 85.28 |
| 24 | ZnOctoate:Triethanol amine (TEA) in 94.85:5.15 wt. % ratio (242.5 ppm) | 6500 | 46500 | 87.74 |
| 25 | ZnOctoate:N,N,N',N'-Tetrakis (2-hydroxyethyl) ethylene-diamine (THEED) in 94.85:5.15 wt. % ratio (242.5 ppm) | 8000 | 45000 | 84.91 |
| 26 | ZnOctoate:N,N,N',N'-Tetrakis (2-hydroxypropyl) ethylene-diamine (Quadrol ®) in 94.85:5.15 wt. % ratio (242.5 ppm) | 9000 | 44000 | 83.02 |
| 27 | ZnOctoate:Propoxylated Ethylene diamine (PED) in 95:5 wt. % ratio (250 ppm) [Avg. MW 1300 to 1400 Dalton] | 12000 | 41000 | 77.36 |
| 28 | Zn Octoate + PPG-400 in 94.85:5.15 wt. % ratio (242.5 ppm) | 19000 | 34000 | 64.15 |
| 29 | Zn Octoate + PEG-400 in 94.85:5.15 wt. % ratio (242.5 ppm) | 19500 | 33500 | 63.21 |
| 30 | Zn Octoate + Benz Quat* in 94.85:5.15 wt. % ratio (242.5 ppm) | 18500 | 34500 | 65.09 |

*Benz Quat is also known as benz alkonium chloride, & is available from Galaxy Surfactants (Cat. no. BKC80)

The Zn Octoate used in the experiments was 82.5% and rest was the solvent.

Therefore, the present experimental findings have confirmed that:

a) The activators of the present invention, surprisingly and unexpectedly, substantially improve or maintain 100% efficiency of the $H_2S$ scavenging efficiency of the additive 1. Therefore, the use of the additive 1 has also been made more beneficial than what was known in the prior art.

The above experimental findings confirm surprising, and unexpected technical effects and advantages, and synergistic property of the presently provided hydrogen sulfide scavenging additive compositions.

The above findings also confirm that compositions of the present invention have technical advantages and surprising effects over the prior art and comparative additives and compositions.

It may be noted that the present invention has been described with the help of foregoing examples, which are not intended to limit scope of the present invention, but are only illustrative. As described herein, a person skilled in the art would know that it is possible to apply the present invention with various other additives (the additive 1 and the additive 2), and in various other media without deviating from the scope and spirit of the present invention.

Furthermore, as amount of the prior art additive 1 has been substantially reduced to achieve desired scavenging efficiency, the present compositions are more economical and environmental friendly.

It may be noted that the term "about" as employed herein is not intended to enlarge scope of claimed invention, but has been incorporated only to include permissible experimental errors of the field of the present invention.

The invention claimed is:

1. A hydrogen sulfide scavenging additive composition, wherein the composition comprises:
   a. an additive 1 comprising zinc salt of organic acid; and
   b. at least one activator comprising one or more hydroxyl alkylated amine;
   wherein the zinc salt of organic acid comprises zinc octoate (ZnOctoate);
   wherein the activator comprises:
   (i) tris(2-hydroxypropyl)amine (TIPA);
   (ii) a propoxylated derivative of tris(2-hydroxypropyl) amine (propoxylated TIPA) having average molecular weight of 1300 to 1400 Dalton;
   (iii) an ethoxylated derivative of tris(2-hydroxypropyl) amine (ethoxylated TIPA); or
   (iv) a mixture thereof.

2. The composition as claimed in claim 1, wherein the composition further comprise an additive 2, wherein the additive 2 comprises polyphosphoric acid (PPA).

3. A method of using the hydrogen sulfide scavenging additive composition as claimed in claim 1 for scavenging the hydrogen sulfide in a medium.

4. The method as claimed in claim 3, wherein the medium comprises a material capable of forming hydrogen sulphide ($H_2S$) or a sulfur compound when in use.

5. The method as claimed in claim 3, wherein the medium is selected from the group comprising hydrocarbons, crude oil, gasoline, diesel oil, fuel oil, bitumen, asphalt including asphalt refinery residue, and kerosene oil.

6. A method of scavenging hydrogen sulphide in a medium by employing the hydrogen sulfide scavenging additive composition as claimed in claim 1.

7. A medium comprising hydrogen sulfide ($H_2S$) scavenging additive composition, wherein the hydrogen sulfide ($H_2S$) scavenging additive composition comprises;
   a. an additive 1 comprising zinc salt of organic acid; and
   b. at least one activator comprising one or more hydroxyl alkylated amine;
   wherein the zinc salt of organic acid comprises zinc octoate (ZnOctoate);
   wherein the activator comprises:
   (i) tris(2-hydroxypropyl)amine (TIPA);
   (ii) a propoxylated derivative of tris(2-hydroxypropyl) amine (propoxylated TIPA) having average molecular weight of 1300 to 1400 Dalton;
   (iii) an ethoxylated derivative of tris(2-hydroxypropyl) amine (ethoxylated TIPA); or
   (iv) a mixture thereof.

8. The medium as claimed in claim 7, wherein the medium comprises a material containing at least one of hydrogen sulphide ($H_2S$) and a sulfur compound.

9. The medium as claimed in claim 7, wherein the medium comprises a material capable of forming hydrogen sulphide ($H_2S$) or a sulfur compound when in use.

10. The medium as claimed in claim 7, wherein the medium is selected from the group comprising hydrocarbons, crude oil, gasoline, diesel oil, fuel oil, bitumen, asphalt including asphalt refinery residue, and kerosene oil.

11. The method as claimed in claim 3, wherein the medium comprises a material containing at least one of hydrogen sulphide ($H_2S$) and a sulfur compound.

12. A method of using the hydrogen sulfide scavenging additive composition as claimed in claim 2 for scavenging the hydrogen sulfide in a medium.

13. The method as claimed in claim 12, wherein the medium comprises a material containing at least one of hydrogen sulphide ($H_2S$) and a sulfur compound.

14. The method as claimed in claim 12, wherein the medium comprises a material capable of forming hydrogen sulphide ($H_2S$) or a sulfur compound when in use.

15. The method as claimed in claim 12, wherein the medium is selected from the group comprising hydrocarbons, crude oil, gasoline, diesel oil, fuel oil, bitumen, asphalt including asphalt refinery residue, and kerosene oil.

16. A method of scavenging hydrogen sulphide in a medium by employing the hydrogen sulfide Scavenging additive composition as claimed in claim 2.

17. The medium as claimed in claim 7, wherein the hydrogen sulfide ($H_2S$) scavenging additive composition further comprises an additive 2, wherein the additive 2 comprises polyphosphoric acid (PPA).

* * * * *